United States Patent
Crocker

(10) Patent No.: US 12,503,823 B2
(45) Date of Patent: Dec. 23, 2025

(54) IMPACT ATTENUATOR SAFETY TRUCK

(71) Applicant: CROC Enterprises, LLC

(72) Inventor: James P. Crocker, Stuart, FL (US)

(73) Assignee: CROC Enterprises, LLC, Stuart, FL (US)

( * ) Notice: Subject to any disclaimer, the term of this patent is extended or adjusted under 35 U.S.C. 154(b) by 472 days.

(21) Appl. No.: 18/061,326

(22) Filed: Dec. 2, 2022

(65) Prior Publication Data

US 2023/0175217 A1  Jun. 8, 2023

Related U.S. Application Data

(60) Provisional application No. 63/264,908, filed on Dec. 3, 2021.

(51) Int. Cl.
*E01F 15/00*  (2006.01)
*E01F 15/14*  (2006.01)

(52) U.S. Cl.
CPC ................... *E01F 15/148* (2013.01)

(58) Field of Classification Search
CPC . E01F 9/662; E01F 9/70; E01F 15/145; E01F 15/148
USPC ........................................... 404/6, 8
See application file for complete search history.

(56) References Cited

U.S. PATENT DOCUMENTS

| | | | | |
|---|---|---|---|---|
| 6,092,959 A * | 7/2000 | Leonhardt | ............... | B60R 19/00 293/133 |
| 6,581,992 B1* | 6/2003 | Gertz | ................... | E01F 15/148 293/133 |
| 11,400,884 B1* | 8/2022 | Maus | ..................... | B60R 19/00 |
| 2009/0166998 A1* | 7/2009 | Groeneweg | ........... | E01F 15/088 256/13.1 |
| 2019/0330811 A1* | 10/2019 | Roy | ......................... | E01F 9/70 |
| 2021/0381179 A1* | 12/2021 | Boyle | ..................... | G08G 1/22 |

\* cited by examiner

*Primary Examiner* — William V Gilbert
(74) *Attorney, Agent, or Firm* — McHale & Slavin, P.A.

(57) ABSTRACT

An impact attenuator safety truck with a configurable flatbed capable of carrying a forklift. The safety truck provides a crash barrier for roadway construction projects using impact absorbing sections (TMAs) that are movable from a stowage position above the surface of the flatbed, thereby allowing the entire surface of the flatbed for storage. The forklift is secured to the flatbed when the impact absorbing sections are in the stowage position. When the impact absorbing sections are in a deployed position, the forklift can access the flatbed surface from either side. A pair of hydraulic cylinders in combination with pivot arms and a cradle allows rotating of the impact absorbing sections between the stowage position and deployed position.

8 Claims, 7 Drawing Sheets

IMPACT ATTENUATOR SAFETY TRUCK

PRIORITY CLAIM

This application claims the benefit of U.S. Provisional Patent Application Ser. No. 63/264,908 filed Dec. 3, 2021 entitled "IMPACT ATTENUATOR SAFETY TRUCK", the contents of which is incorporated herein by reference.

FIELD OF THE INVENTION

The invention is directed to the field of roadway repair and, more specifically, to a vehicle for use in protecting construction crews and equipment working in close proximity with moving traffic.

BACKGROUND OF THE INVENTION

Roadway construction is preferably performed when no moving traffic is present. Unfortunately, the closing of a roadway to perform construction, such as road repair, is not always possible. Shutting down a major roadway that is heavily travelled can disrupt the lives of thousands of motorists. For this reason, most all roadway construction performed on or adjacent to moving traffic must include provisions to address the inattentive motorists passing the construction area. It is not uncommon for some of the passing motorists to be impaired due to sleep deprivation, intoxication or impatience (road rage). The inattentive motorist may wander into the construction area and collide with construction equipment or, more critically, construction workers.

To help prevent construction site collisions, construction crews are required to wear brightly color work cloths. Governments have doubled if not tripled fines for speeding near construction sites. Police presence with patrol car flashing lights are commonly used. Portable barriers have been erected with flashing lights. Construction crews have tried to limit work to nights and weekends. In fact, numerous devices have been developed with the primary purpose of reducing or eliminating damage to the construction workers and construction equipment.

Despite the implementation of all the protection measures described, accidents continue to take place. The kinetic energy of a speeding vehicle can breach most barriers. In addition, accidents are not limited to fixed construction sites; construction crews performing rolling roadway repair are also at risk. For instance, removal and replacement of road surface markings such as white edge road lines, yellow divider and passing lines, reflective markers such as Botts' dots and the like, rumble strips and stripes, and so forth are performed with the construction equipment and crews covering miles of roadway in a single shift.

Whether the construction/repair site is stationary or moving, safety barriers capable of absorbing the kinetic energy have become a necessary form of protection. This is particularly important while performing rolling roadway repair.

Rolling construction equipment is typically followed by trucks carrying warning signage and an impact attenuator. Impact attenuators, also known as crash cushions, are intended to protect the construction crew and equipment and reduce the damage to an impacting vehicle. Impact attenuators are designed to absorb the colliding vehicle's kinetic energy and redirect the colliding vehicle away from the rolling construction equipment.

Impact attenuators are known in the industry and conventionally consist of a structure mounted on the rear of a vehicle so as to become the first component that is struck by a colliding vehicle. The impact attenuator absorbs most, if not all, of the kinetic energy exerted by the impact from the colliding vehicle. A properly designed impact attenuator forms a sacrificial "crumple zone" to help save the occupants of the colliding vehicle, as well as the construction crew.

Known impact attenuator trucks are primarily directed to provide collision protection from the inattentive driver. The impact attenuator apparatus is typically carried on the bed of a truck and positioned behind the rear of the truck for operation. Impact attenuators mounted to the rear of a vehicle severely limit the use of the vehicle for other purposes.

Most known trucks that include an impact attenuator are limited to a single use. The industry is most receptive to equipment capable of multiple functions which reduces the amount of equipment and personnel required to perform a construction project.

What is lacking in the art is an impact attenuator truck capable of carrying supply materials, including a fork lift, allowing the impact attenuator truck to also operate as a supply truck to the construction vehicle.

SUMMARY OF THE INVENTION

The present invention addresses such needs and deficiencies as are explained above by providing an improved impact attenuator safety truck. The impact attenuator safety truck includes an operator cab with a configurable flatbed. A pair of impact absorbing sections, movable from a position spaced apart from the surface of the flatbed, allows the flatbed to store materials and supplies. A forklift is secured to the flatbed when the impact absorbing sections are in a stored position. When the impact absorbing sections are in a deployed position, the forklift has uninhibited access to the flatbed surface. A pair of hydraulic cylinders used in conjunction with pivot arms rotates the impact absorbing sections from the stored position to the deployed position.

The impact attenuator safety truck may be used to carry supplies such as thermoplastic road marking material to accompany a construction vehicle capable of applying roadway markings. For instance, when a thermoplastic extrusion vehicle is used to melt and deliver molten material to a roadway for striping, the thermoplastic mix is packaged pellets in bags which are liquefied in a kettle. The thermoplastic mix may be yellow or white and the application will commonly include glass beads for reflectivity. A typical thermoplastic extrusion vehicle can melt and lay down liquefied material at a rate of 8,000 pounds per hour, per color. Should a truck consist of a white melting kettle and a yellow melting kettle, the truck could melt and lay down 16,000 total pounds per hour. Further, by having thermoplastic mix readily available to the thermoplastic extrusion vehicle, smaller melters may be contemplated.

The impact attenuator safety truck of the instant invention is capable of carrying a deployable impact attenuator, a bed load of supply material, and a fork lift for moving the material; the impact attenuators being in place for protection of the road repair crew and equipment, and the forklift used to avoid heavy lifting. Another example would be the use of temporary rumble strips for use in slowing down the traffic pattern. In such an example, a supply of Bott's dots or temporary rumble strips may be stored on the flatbed to supply the application vehicle. By combining a truck with a load carrying ability, a fork lift, and an impact attenuator, the need for additional supply vehicles and personnel can be eliminated.

An objective of the invention is to disclose an impact attenuator safety truck having an open bed for carrying supplies and a fork lift for movement of the supplies.

Another objective of the invention is to disclose an impact attenuator having improved kinetic energy absorption.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
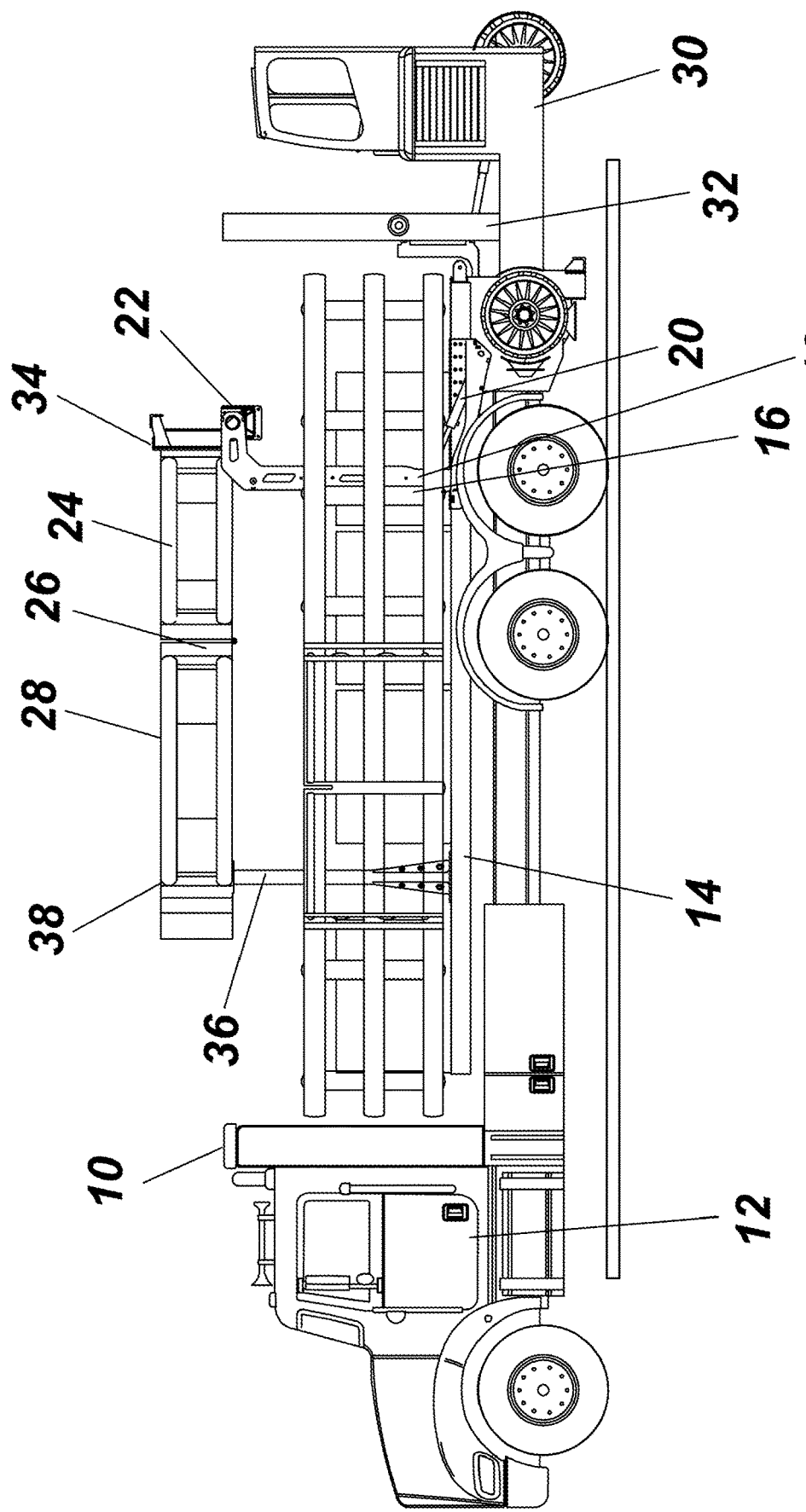
FIG. 1 is a pictorial view of the impact attenuator safety truck with a fork lift.

Referring to FIG. 1, depicted is a pictorial view of the impact attenuator safety truck 10 of the instant invention. The safety truck 10 includes an operator cab 12 having a drive train, a configurable flatbed 14, side rails 16, and a pivot arm 18 operated by a pair of hydraulic cylinders 20. The drive train defined as the propulsion equipment wherein the truck is self contained and can be operated on roadways. The side rails 16 are just one embodiment of the flatbed configuration, wherein one or more side rails may be employed. Alternative material can be strapped to the flatbed surface, not shown. An upper hinge 22 of the pivot arm 18 is rotatably coupled to a first impact absorbing section 24 which has a coupling hinge 26 to a second impact absorbing section 28, commonly referred to a truck mounted attenuator (TMA). The TMA's extend rearward from the flatbed (14) and are designed to crumple in a controlled manner to dissipate and absorb the kinetic energy of a roadway vehicle that may accidentally crash into the TMA attachment. In a storage position, the first and second impact absorbing sections 24, 28 are positioned above the configurable flatbed 14, wherein the forklift 30 can be secured to the rear 32 of the flatbed 14. The forklift 30 can be readily removed and used to remove the side rails 16 for access to material on the flatbed 14. The first and second impact absorbing sections 24, 28 are suspended above the flatbed 14 by the pivot arm 18 on a proximal end 34 and a support stand 36 along near an end of the flatbed 14.

Figure 2:
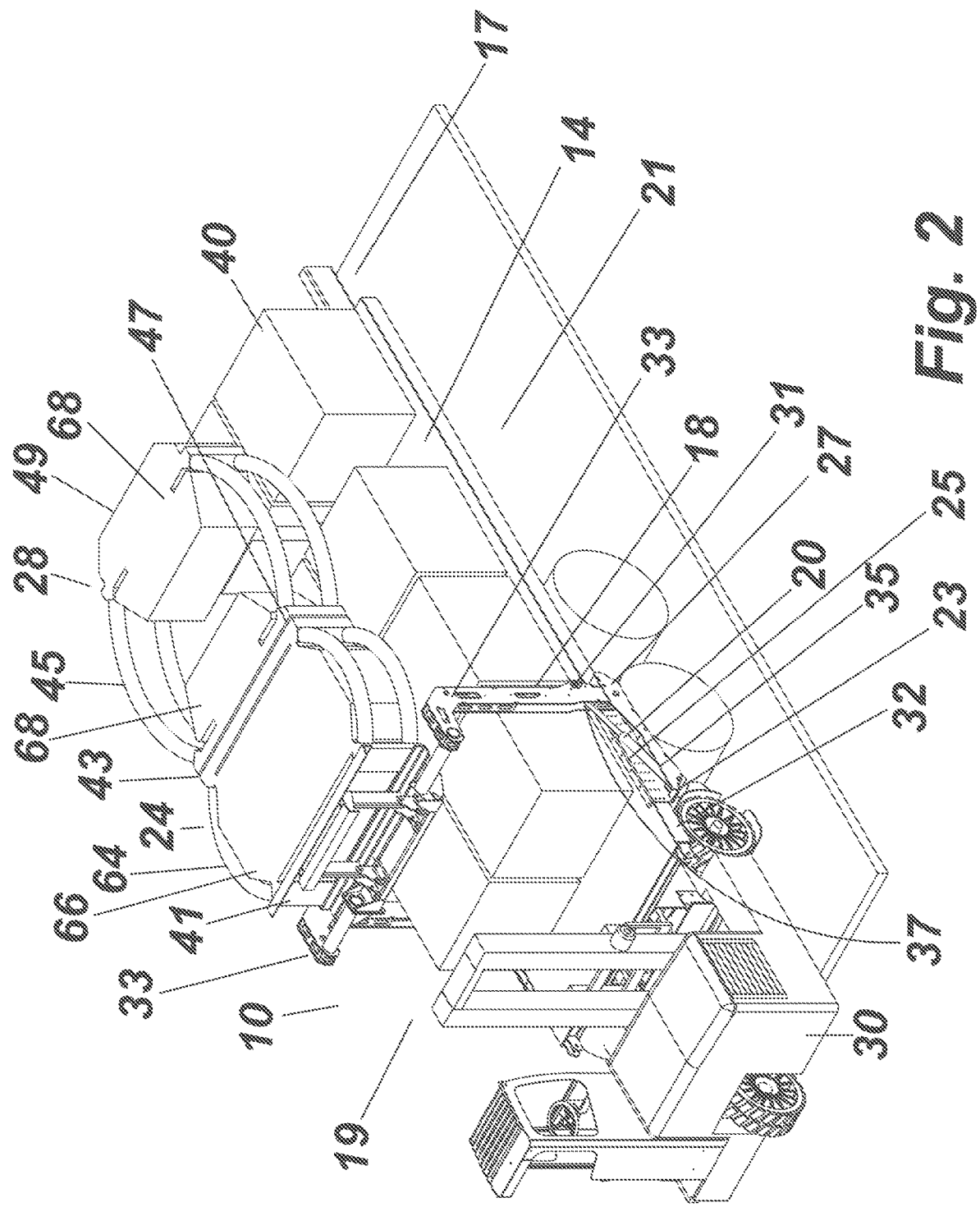
FIG. 2 is a perspective view of the impact attenuator safety truck.
Figure 3:
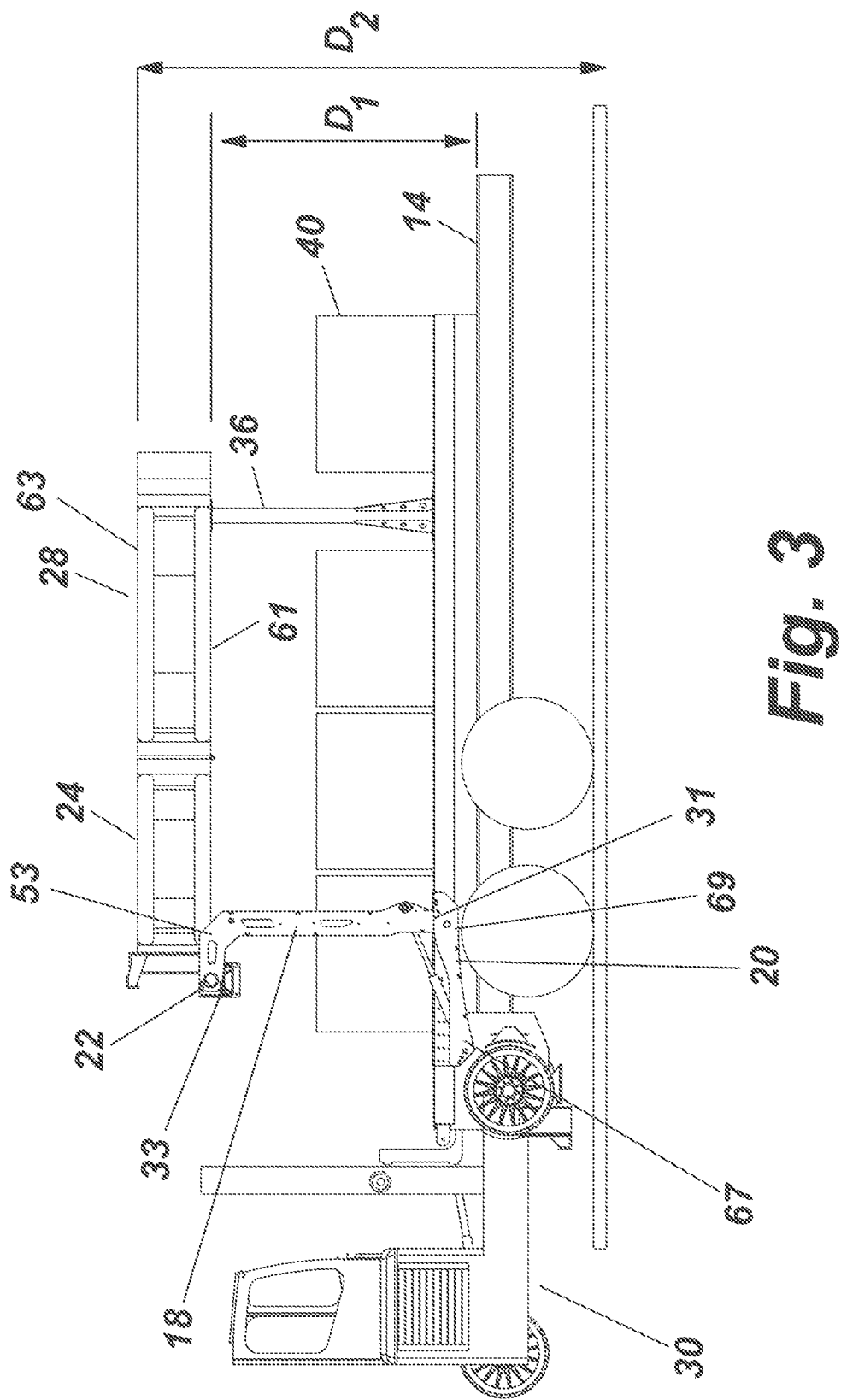
FIG. 3 is a side view thereof.

FIGS. 2 and 3 are views of the safety truck 10 in a transportation stage, depicting the fork lift 30 secured to the rear 32 of the flatbed 14 for purposes of transporting. The configuration of the impact absorbing sections 24, 28 positioned above the flatbed 14 allows for the configuration of the flatbed 14 to hold material; depicted are square containers 40. The distance d1 between the flatbed 14 and the bottom surface 61 of the impact absorbing section 28 is constructed and arranged to maximize the volume of materials that can be placed on the flatbed 14, while the distance d2 between the pavement and the top surface 63 is arranged to meet bridge height restrictions. The first and second impact absorbing sections 24, 28 are suspended above the flatbed 14 by the pivot arm 18, pivotable along the proximal end 34. The upper hinge 22, formed along the distal end 35, forms an upright vertical configuration, together with support stand 36, to better absorb shock loading during transportation. The upper hinge includes a mechanism for rotating the first absorbing section by use of a set of hydraulic cylinder similar to the first pair of hydraulic cylinders 20. Similarly the second absorbing section is rotated in relation to the first absorbing section by a set of hydraulic cylinders, again similar to the first set of cylinders 20. The figures do not further illustrate the cylinders for ease of drawing description but are duplicative of the first set of cylinders 20.

Figure 4:
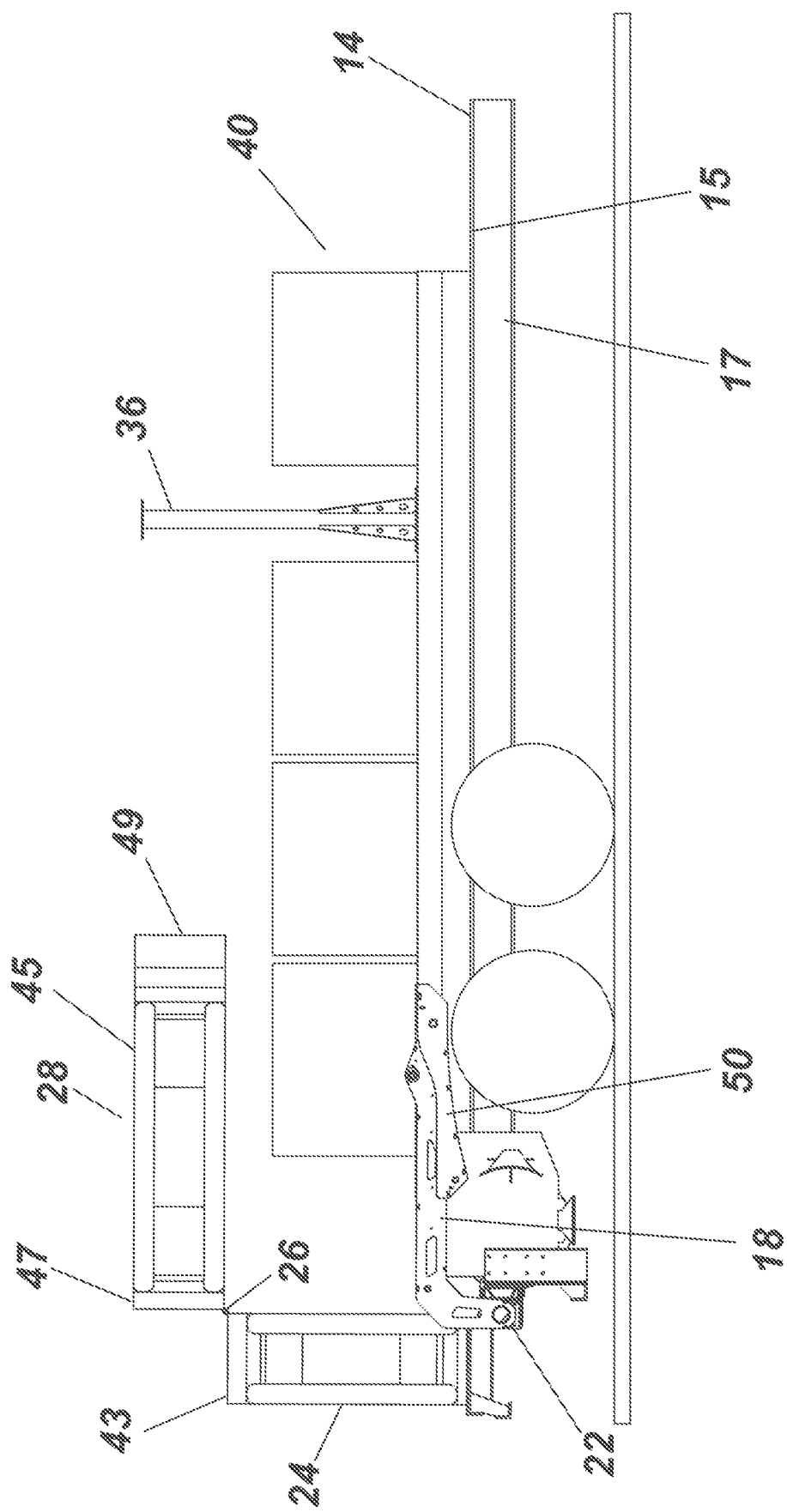
FIG. 4 is a side view of the impact attenuator safety truck without the fork lift and in the first stage of deployment.

FIG. 4 depicts the safety truck with the fork lift 30 removed and the impact absorbing sections 24 and 28 in a first stage of deployment. The pivot arm 18 is drawn down by the hydraulic cylinder 20 on each side of the flatbed 14; the hydraulic cylinder 20 bringing the pivot arm 18 into a support cradle 50, with the first impact absorbing section 24 rotated in a vertical position by use of the upper hinge member 22 and the second impact absorbing section 28 positioned 90 degrees to the first impact absorbing section 24 by coupling hinge 26.

Figure 5:
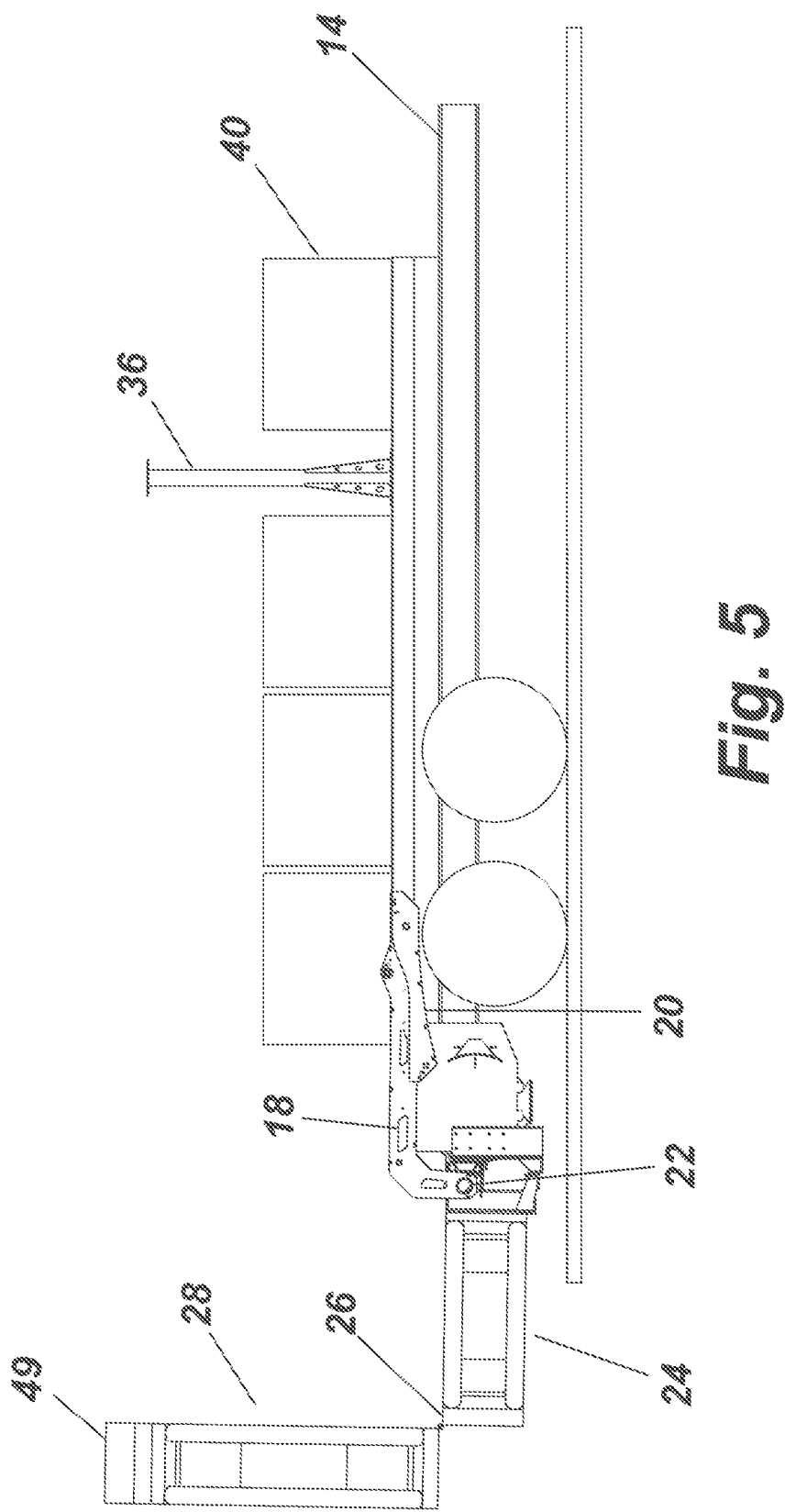
FIG. 5 is a side view of the impact attenuator safety truck without the fork lift and in the second stage of deployment.

FIG. 5 depicts the safety truck with the fork lift 30 removed and the impact absorbing sections 24 and 28 in a second stage of deployment, wherein the first impact absorbing section 24 is rotated into a horizontal position by use of the upper hinge member 22 and the second impact absorbing section 28 is positioned 90 degrees to the first impact absorbing section 24 by coupling hinge 26.

Figure 6:
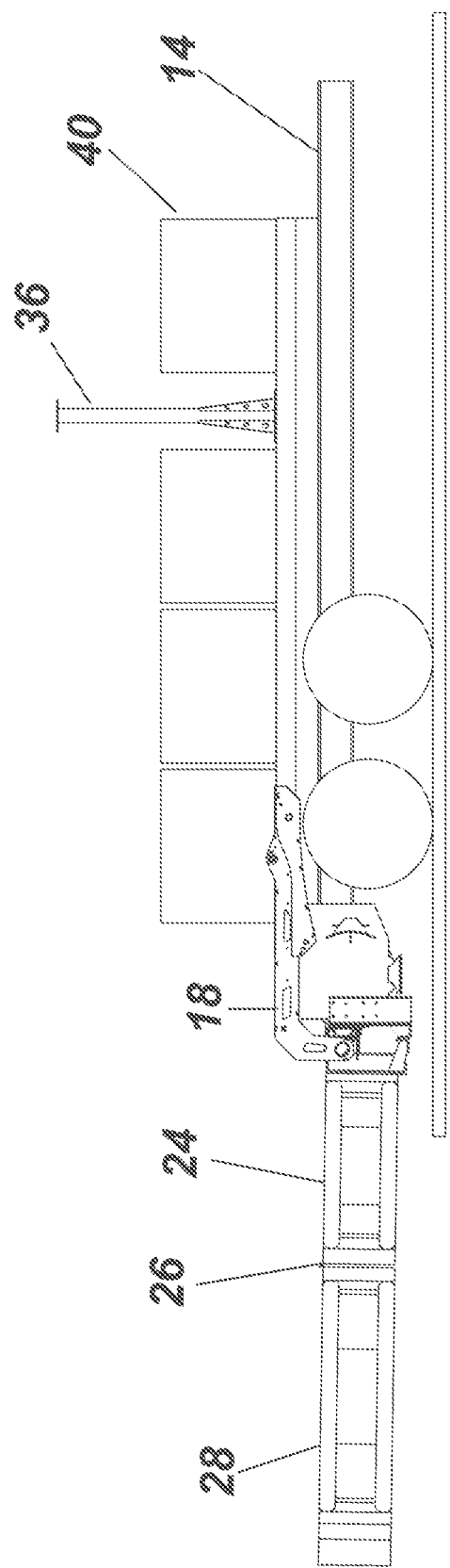
FIG. 6 is a side view of the impact attenuator safety truck without the fork lift and in the full stage of deployment.
Figure 7:
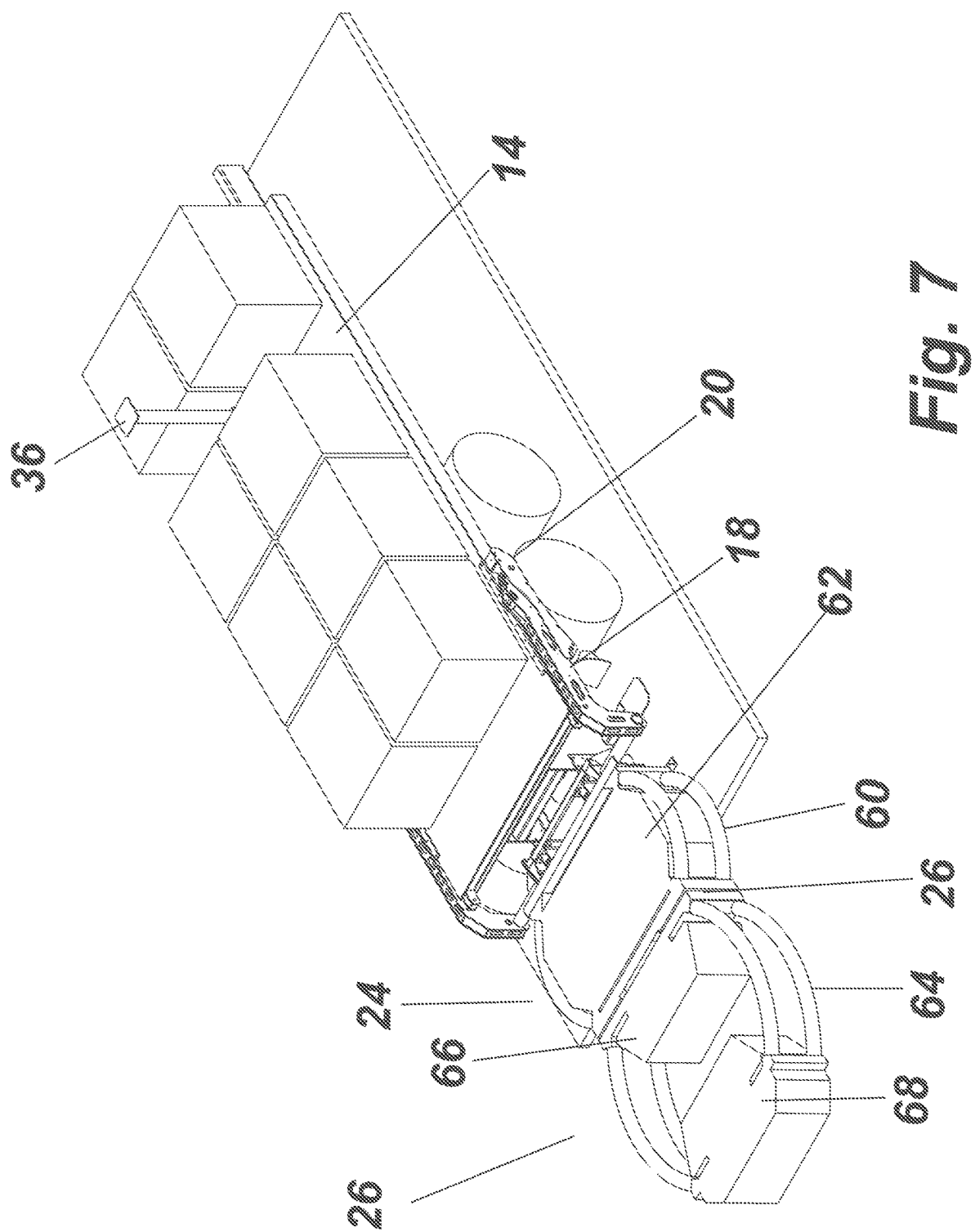
FIG. 7 is a perspective of FIG. 6.

FIGS. 6 and 7 depict the safety truck with the fork lift removed and the impact absorbing sections 24 and 28 in the fully deployed stage, wherein the second impact absorbing section 28 is rotated into a horizontal position by use of coupling hinge 26. The first and second impact absorbing sections 24, 28 are positioned in the same plane as the flatbed 14. The first impact absorbing section 24 have a first set of outwardly curved structural members surrounding an impact section 62. The second impact absorbing section 28 having a second set of outwardly curved structural members 64 associated with an inner impact member 66 and an outer impact member 68. The first and second impact absorbing sections 24, 28 are constructed and arranged to remove the kinetic energy from a vehicle colliding with the structure.

In summary the impact attenuator safety truck 10 comprises a forward facing operator cab 12 containing a propulsion system, drive train including an engine, for driving the truck along a roadway surface. A flatbed 14 is located behind the cab 12 having a generally flat surface 15 positioned above a flatbed support 17, the flatbed is accessible from either side for once the safety rails 16 are removed. A pair of cradles 20 spaced apart and positioned on each side 19, 21 of the flatbed 14, each cradle 20 having a base wall 23, a first side wall 25 and a second side wall 27 extending upward from said base wall 23 with a proximal end 67 and a distal end 69. The proximal end 29 of each cradle 20 rotatably coupled to said flatbed support 17. For ease of drawing description and clarity, it is understood that the cradle and pivot arms are positioned on each side of the flatbed and form a mirror image. The pair of pivot arms 18 each have a first end 31 and a second end 33. The first end 31 of each pivot arm 18 coupled to the proximal end 29 of said cradle 20. The pair of pistons 20 each have a lower end 35 coupled to the cradle 20 and an upper end 37 coupled to the pivot arm 18. Each piston 20 constructed and arranged to pivot the cradle 20 between a substantially horizontal plane relative to the cradle 20 and a substantially perpendicular plane relative to the cradle 20.

The first impact absorbing section 24 has a base 41 hingedly coupled to the second ends 33 of the pivot arms 18 and a back end 43. A first mechanism is used to selectively move the first impact absorbing section 24 between a perpendicular position relative to the pivot arms 18 and a substantially parallel position to the pivot arms 18. The second impact absorbing section 28 has a front end hingedly coupled to the back end 43 of the first impact absorbing section 24 and a tail end 49. The second mechanism allows for selectively moving the second impact absorbing section 28 between a perpendicular position relative to the first impact absorbing section 24 and a substantially in-line position relative to the first impact absorbing section 24. Upon activation of the pistons 20 the first and second impact absorbing sections 24, 28 can be moved from a stowage position above the flatbed 14 to a deployed horizontal position behind the flatbed 14. The impact absorbing sections are constructed and arranged to absorb kinetic energy from rear end collisions. Unique to the invention is the ability to support a fork lift truck 30 to the rear of the flatbed 14.

The impact attenuator safety truck 10 according to claim 1 wherein said first impact absorbing section 24 includes outwardly curved structural members 64 coupling said base 33 to the back end 43 and an inner impact member 66. The second impact absorbing section 28 includes outwardly curved structural members 45 coupling the front end 47 to the tail end 49. An outer impact member 68 is attached to the tail end 49 and a inner impact member 51 is secured to the front end 47.

A support stand 36 is secured to the flatbed 14 to support the second impact member 28 in a position above the flatbed 14. The pivot arm 18 includes an L-shaped section 53 to position the impact absorbing sections 24, 28 at a position beneath a surface 15 of said flatbed 14, at an average height to stop a colliding vehicle. A portion of each said pivot arm 18 is constructed and arranged to fit within each cradle 20 side walls 25, 27 maintaining the pivot arm 18 in an optimum position for impact by a colliding vehicle.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An impact attenuator safety truck comprising:
  a forward facing operator cab containing a propulsion system for driving the truck along a roadway surface;
  a flatbed located behind the cab having a generally flat surface positioned above a flatbed support;
  a first cradle positioned on a first side of the flatbed and a second cradle positioned on a second side of the flatbed, the second side being opposite the first side, each of the first cradle and the second cradle having a base wall, a first side wall and a second side wall extending upward from the base wall with a proximal end and a distal end, the proximal end of each of the first cradle and the second cradle being rotatably coupled to the flatbed support;
  a first pivot arm having a first end and a second end, the first end being coupled to the proximal end of the first cradle;
  a second pivot arm having a first end and a second end, the first end of the second pivot arm being coupled to the proximal end of the second cradle;
  a first piston having a lower end coupled to the first cradle and an upper end coupled to the first pivot arm, the first piston being configured to pivot the first cradle between a substantially horizontal plane relative to the first cradle and a substantially vertical plane relative to the first cradle;
  a second piston having a lower end coupled to the second cradle and an upper end coupled the second pivot arm, the second piston being configured to pivot the second cradle between a substantially horizontal plane relative to the second cradle and a substantially vertical plane relative to the second cradle;

a first impact absorbing section having a base hingedly coupled to the second end of the first pivot arm and the second end of the second pivot arm, the first impact absorbing section including a back end, wherein the first impact absorbing section is configured to move between a perpendicular position relative to the first pivot arm and the second pivot arm and a substantially parallel position relative to the first pivot arm and the second pivot arm; and a second impact absorbing section having a front end hingedly coupled to the back end of the first impact absorbing section, the second impact absorbing section including a tail end, wherein the second impact absorbing section is configured to move between a perpendicular position relative to the first impact absorbing section and a substantially in-line position relative to the first impact absorbing section, wherein the first piston and the second piston are configured to be actuated to move the first impact absorbing section and the second impact absorbing section from a stowage position above the flatbed to a deployed horizontal position behind the flatbed to absorb kinetic energy from a rear end collision.

2. The impact attenuator safety truck according to claim 1, including a fork-lift truck securable to an end of the flatbed when the first impact absorbing section and the second impact absorbing section are positioned above the flatbed.

3. The impact attenuator safety truck according to claim 1, wherein the first impact absorbing section includes outwardly curved structural members coupling the base to the back end and to an inner impact member.

4. The impact attenuator safety truck according to claim 1, wherein the second impact absorbing section includes outwardly curved structural members coupling the front end to the tail end.

5. The impact attenuator safety truck according to claim 4, including an outer impact member attached to the tail end and to an inner impact member secured to the front end.

6. The impact attenuator safety truck according to claim 1, including a support stand secured to the flatbed to support the second impact absorbing section in a position above the flatbed.

7. The impact attenuator safety truck according to claim 1, wherein the first pivot arm and the second pivot arm include L-shaped sections to position the first impact absorbing section and the second impact absorbing section at positions beneath the surface of the said flatbed.

8. The impact attenuator safety truck according to claim 1, wherein a portion of the first pivot arm is constructed and arranged to fit within the first cradle such that the first side wall and the second side wall of the first cradle maintain the first pivot arm within the first cradle during deployment of the first impact absorbing section and the second impact absorbing section; and wherein a portion of the second pivot arm is constructed and arranged to fit within the second cradle such that the first side wall and the second side wall of the second cradle maintain the second pivot arm within the second cradle during deployment of the first impact absorbing section and the second impact absorbing section.

\* \* \* \* \*